(12) United States Patent
Pudipeddi et al.

(10) Patent No.: US 7,779,425 B2
(45) Date of Patent: *Aug. 17, 2010

(54) MANAGED FILE SYSTEM FILTER MODEL AND ARCHITECTURE

(75) Inventors: Ravisankar Pudipeddi, Sammamish, WA (US); Eileen C. Brown, Seattle, WA (US); Neal Christiansen, Bellevue, WA (US); Ravinder Thind, Kirkland, WA (US); Brian K. Dewey, Seattle, WA (US); David P. Golds, Redmond, WA (US); Mark J. Zbikowski, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1056 days.

This patent is subject to a terminal disclaimer.

(21) Appl. No.: 11/344,258

(22) Filed: Jan. 30, 2006

(65) Prior Publication Data

US 2006/0136460 A1    Jun. 22, 2006

Related U.S. Application Data

(63) Continuation of application No. 10/315,384, filed on Dec. 9, 2002, now Pat. No. 6,993,603.

(51) Int. Cl.
*G06F 3/00* (2006.01)
*G06F 9/44* (2006.01)
(52) U.S. Cl. ........................ 719/321; 710/54; 707/705
(58) Field of Classification Search ................. 719/321
See application file for complete search history.

(56) References Cited

U.S. PATENT DOCUMENTS

| | | | | |
|---|---|---|---|---|
| 6,363,400 | B1 | 3/2002 | Chtchetkine et al. | 707/200 |
| 6,389,427 | B1* | 5/2002 | Faulkner | 707/104.1 |
| 6,389,433 | B1* | 5/2002 | Bolosky et al. | 707/749 |
| 6,611,863 | B1 | 8/2003 | Banginwar | 709/220 |
| 2001/0020245 | A1* | 9/2001 | Golds et al. | 709/102 |

FOREIGN PATENT DOCUMENTS

EP            1225509           7/2002

OTHER PUBLICATIONS

Office Action dated Mar. 24, 2005 cited in U.S. Appl. No. 10/315,384.

* cited by examiner

*Primary Examiner*—Li B Zhen
(74) *Attorney, Agent, or Firm*—Workman Nydegger (57) ABSTRACT

A model in which filter drivers are managed to receive callbacks for I/O requests in which the filter drivers have registered an interest. Per-volume instances of filter drivers register with a filter manager for pre-callbacks (for I/O to the file system) and post-callbacks (for I/O from the file system), and identify which I/O requests (e.g., create, read, write) they are registering to receive callbacks. The filter manager orders the instances for callbacks. When an I/O request is received, the filter manager converts the I/O request to callback data and calls the interested filters in the callback order, whereby the filter instances can process the I/O data. As the request returns from the file system, filters desiring post callbacks are called in the reverse order. Efficient context management for the filters and other functions, such as non-reentrant file I/O, are also provided by the model.

15 Claims, 7 Drawing Sheets

MANAGED FILE SYSTEM FILTER MODEL AND ARCHITECTURE

This application is a continuation of U.S. patent application Ser. No. 10/315,384, now U.S. Pat. No. 6,993,603, filed Dec. 9, 2002 and entitled "Managed file system filter model and architecture."

FIELD OF THE INVENTION

The invention relates generally to computer systems, and more particularly to file systems and file systems filters.

BACKGROUND OF THE INVENTION

With contemporary operating systems, such as Microsoft Corporation's Windows® XP operating system with an underlying file system such as the Windows® NTFS (Windows® NT File System), FAT, CDFS, SMB redirector filesystem, or WebDav file systems, one or more file system filter drivers may be inserted between the I/O manager that receives user I/O requests and the file system driver. In general, filter drivers ('filters') are kernel-mode drivers that enhance the underlying file system by performing various file-related computing tasks that users desire, including tasks such as passing file system I/O (requests and data) through anti-virus software, file system quota providers, file replicators and encryption/compression products. For example, antivirus products provide a filter that watches I/O to and from certain file types (.exe, .doc, and the like) looking for virus signatures, while file replication products perform file system-level mirroring. Other types of file system filter drivers are directed to system restoration (which backs up system files when changes are about to be made so that the user can return to the original state), disk quota enforcement, backup of open files, undeletion of deleted files, encryption of files, and so forth. Thus, by installing file system filter drivers, computer users can select the file system features they want and need, in a manner that enables upgrades, replacement, insertion, removal of the components without necessitating the changing the actual operating system or file system driver code.

The existing file system filter model in contemporary Windows®-based operating systems (e.g., Windows® NT, Windows® 2000, Windows® XP, Windows® .NET Server 2003) leverages the inherent I/O model, which is a packet-based approach. To this end, file system filters load as regular drivers in a stack and attach to the underlying file system's volume device objects. User I/O requests are converted by an I/O manager into I/O Request Packets (IRPs), which are sent to the driver stack and processed by the top driver, which may complete it, pass it down in a call to another driver towards the file system, which calls the next lower driver, and so on. In general, each driver does whatever processing it is coded to perform on the IRP, and then explicitly passes down the IRP to the next lower driver (or file system if none are lower), or completes (or fails) the IRP and sends it back up the stack to the next higher driver (or the I/O manager if none are higher).

Although this existing filter driver model provides a number of benefits including being highly flexible, there are also a number of inherent problems with it. For one, writing a file system filter is a non-trivial task, primarily as a result of the underlying complexity of a file system. Filters are highly complex pieces of software that are traditionally hard to debug and maintain. Much of the complexity arises from the filters' handling of the packets, e.g., the need to understand and manipulate IRPs. As a result, reliability suffers, and at least one study has shown that filters have been responsible for a significant percentage of system crashes.

Another problem is efficiency, as file system filters traditionally receive and process every operation that normally goes to a file system, even those in which they have no interest in. For example, an antivirus product can slow down a system as much as sixty percent, but not every I/O request received by an antivirus filter is one that the filter will do anything with, namely inspect any corresponding data for viruses. Redundancy is also a problem that leads to inefficiency and computing cost, as many filters do the same things in different ways, leading to unnecessary code.

Interoperability between drivers is also a significant problem, as, for example, one driver may modify I/O in a way that the other driver does not anticipate and cannot properly deal with. Note that interoperability problems are one of the biggest drawbacks of the existing model, in part because filters have only a very coarse-grained control over attachment ordering to a file system.

Other problems include overflowing stack space, because when two or more filters are installed, stack overflows are common due to recursive reentrant I/O issued by filters. Deadlocks are also common in the existing model, again primarily due to re-entrant I/O. Other problems include the inability to dynamically load and unload filters in the stack, that is, without a system reboot.

In sum, the existing filter driver model has a number of significant drawbacks. What is needed is an improved model and architecture for file system filters to handle file system I/O requests and associated data.

SUMMARY OF THE INVENTION

Briefly, the present invention provides a model/architecture in which filter drivers are managed by a filter manager to receive callbacks for I/O requests in which the filter drivers have registered an interest. The model eliminates traditional, complex I/O passing by providing a managed callback model, in which IRPs, fast I/O paths, Fs Filter callbacks and so forth are translated by a filter manager into callbacks that provide callback data in an explicit, well-defined format into the filters. The filters manipulate the callback data as desired, and return a status in response to the callback, as described below. As one result, filters no longer have to deal with IRPs.

In general, a filter manager translates the I/O, whether an IRP, fast I/O, FS Filter callback or the like, into a uniform structure known as 'callback data'. To this end, the filter manager may be placed into the legacy filter driver stack as if it is a legacy filter driver, so that it can receive and process IRPs. The filter manager then walks through a list of appropriately registered filter drivers to invoke a registered dispatch for the I/O.

Filter drivers comprise may objects (or similar such components) that when instantiated register with a registration mechanism in the filter manager. The filter drivers only register for file system requests in which they may be interested in processing, by notifying the filter manager of the types of I/O requests in which it is interested (e.g., create, read, write, close and so forth). As a result, the model is more efficient than a stacked filter model, because filter drivers do not see I/O requests that they are not interested in, and thus have not registered for.

In one implementation, filter drivers separately attach to volumes as filter driver instances, on a per-volume basis, and a filter driver may attach multiple instances to the same volume. Each filter driver instance is associated with an 'altitude' which indicates where in the callback order that driver is located. The altitude may be pre-defined, or derived from flags provide by the driver that indicate the type of processing the driver will perform on the callback data.

To efficiently track which filter drivers have registered for which types of callbacks and thereby efficiently callback the appropriate drivers in the proper order, the filter manager maintains per-volume, ordered lists, each list indexed by a type of operation for which filters have registered interest in receiving pre-callbacks and/or post-callbacks. The filter manager uses this list to callback the filters in the appropriate order, and each filter returns a status. Assuming success, following the last pre-callback, the filter manager reconverts the callback data to an IRP and sends the IRP to the file system.

Post-callback essentially works in the opposite order, although a filter can indicate that it wants to be skipped over during the post-callbacks. I/O completion is handled by the filter manager in a manner that guarantees that the parameters seen by a filter instance in its pre-callback are the same in its post-callback. To this end, the filter manager maintains a completion node stack which it accesses to return the correct parameters in each post callback.

The filter manager also provides a rich API set that provides functions which filters commonly need. For example, certain filters need to perform I/O of their own, and various functions are provided that facilitate such operations. Various functions also provide efficient context support with instances, volumes, files, stream handles, or streams keeping track of the context data for each filter in association with the appropriate object. The present invention provides notification support via a set of callbacks that setup notification for an entity, and simplifies the association of a per-filter context with that entity. Contexts may be set and/or reset any time. Still other functions enable communication between kernel mode filter drivers and user mode counterpart services and programs, while other functions provide naming support as described in U.S. patent application Ser. No. 10/187,119, filed on Aug. 28, 2002.

Other advantages will become apparent from the following detailed description when taken in conjunction with the drawings, in which:

DETAILED DESCRIPTION

Exemplary Operating Environment

Figure 1:
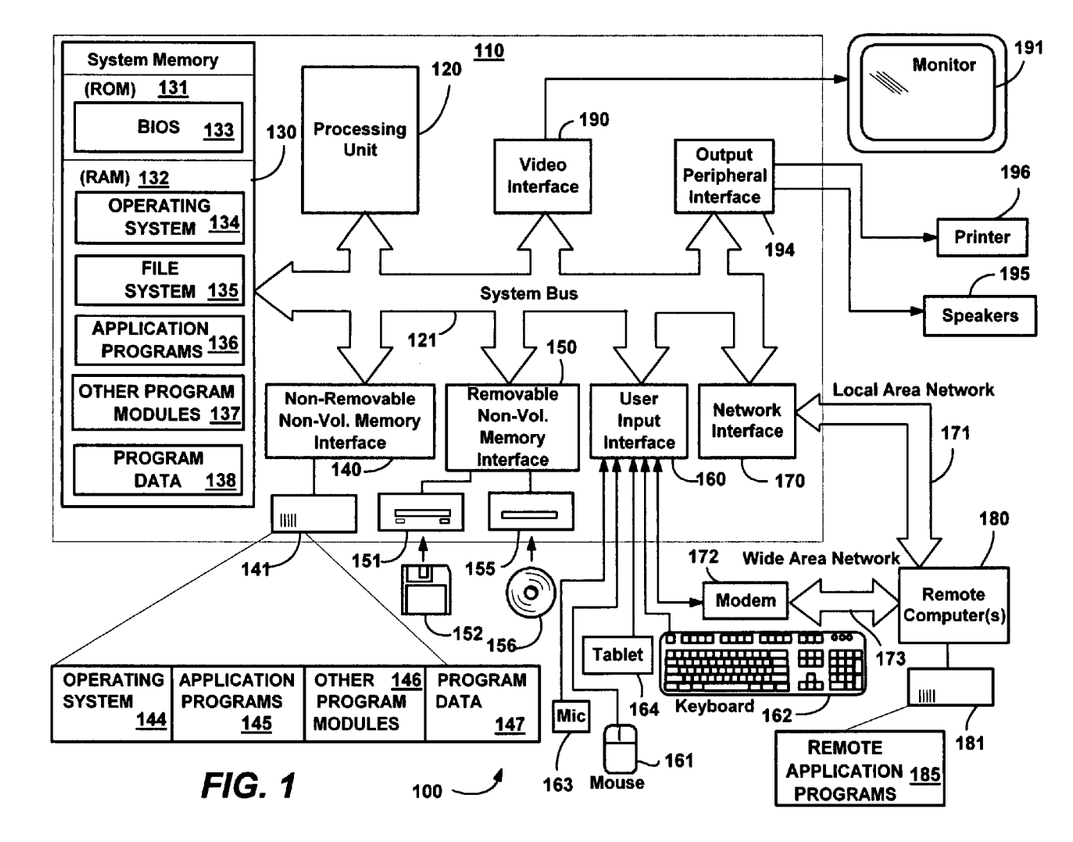
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, file system 135, application programs 136, other program modules 137 and program data 138.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 136, other program modules 137, and program data 138. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Managed File System Filter Model and Architecture

The present invention is generally directed towards a file system filter model and architecture that is intended to improve file system I/O handling by filters, including by facilitating the interoperability among various file system-related products. Note that the model is generally described herein with reference to filter drivers that operate between the I/O manager and a base file system, which can be a local or remote file system, and not described with reference to other drivers, including filter drivers that operate between the file system and the storage driver or drivers (such as FtDisk or DMIO).

As used herein, "legacy" filter drivers are those that handle I/O request packets (IRPs) in the traditional manner, rather than by the new model, which uses callbacks to registered filter drivers as described below. As it is expected that legacy filter drivers will be phased out over time, filter drivers that comply with the new registration and callback model will be referred to herein simply as "filter drivers."

One of the primary aspects of the new filter model is directed to eliminating traditional, complex I/O passing from legacy filter to legacy filter through a stack model, and replace that model with a managed callback model, in which IRPs, fast I/O paths, memory manager callbacks and so forth are translated by a filter manager into callbacks that provide callback data in a defined format into the filters. The filters do not call other filters, or directly pass control to other filters, but rather manipulate the callback data as desired, and return a status in response to the callback, as described below. Since filters no longer have to deal with IRPs and the like, much of the I/O handling complexity is removed from the filters and built into a single filter manager, eliminating many of the problems caused by various filters. For example, IRPs often contain implicit, complex information that legacy filter drivers have traditionally had difficulty in dealing with; the present invention eliminates this problem by having the filter manager deal with the implicit information, and pass only explicit context to the filters. The callback model further has the benefit of solving stack overflow and locking issues that arise due to chained IRP dispatches.

Figure 2:
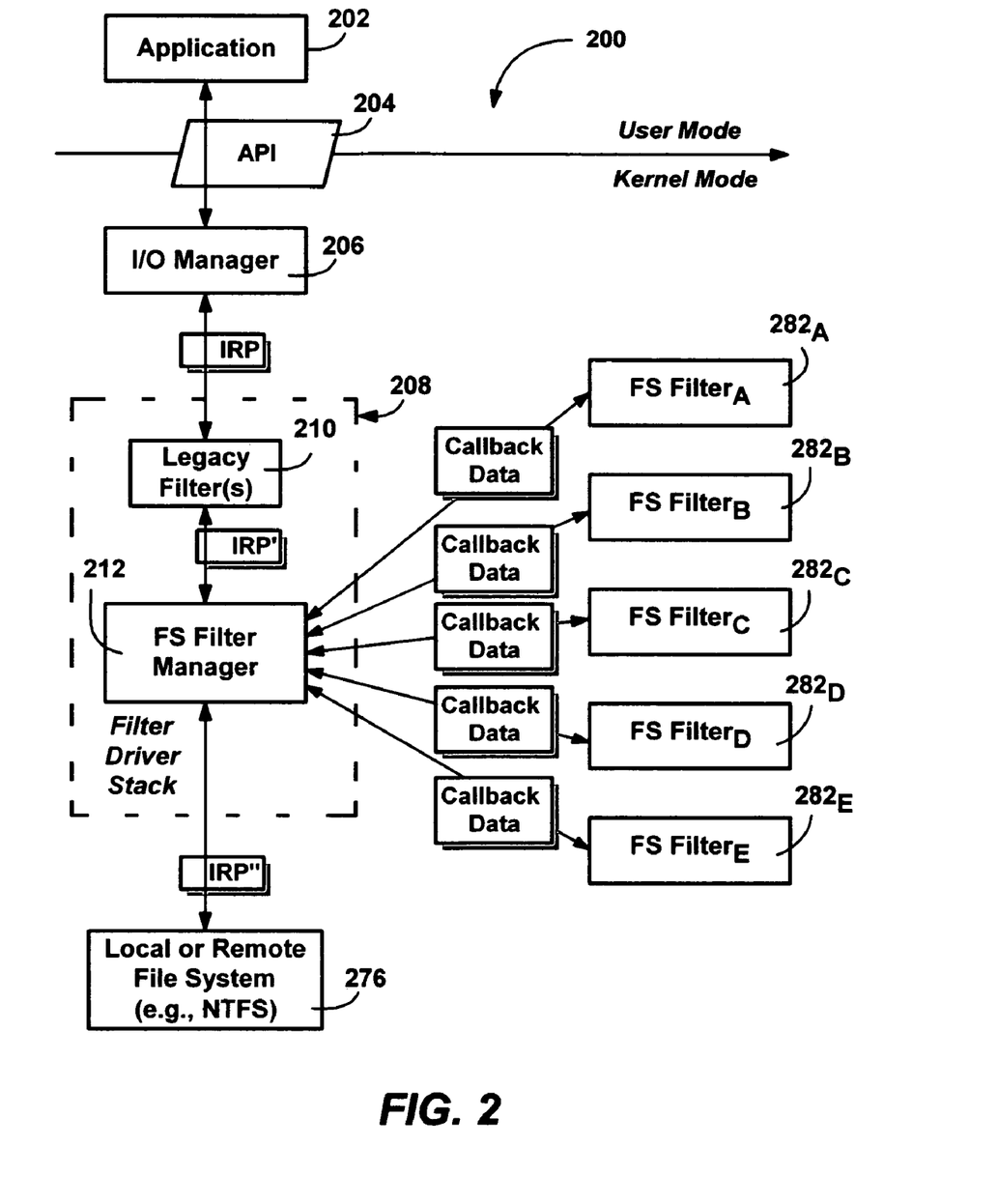
FIG. 2 is a block diagram generally representing an architecture including components for managing the I/O to filters in accordance with an aspect of the present invention.

FIG. 2 represents an example implementation 200 of the new model. One advantage of the implementation represented in FIG. 2 is that existing applications, operating system components and file systems need not be modified in any way to implement the new model. For example, in a Windows®-based operating system, an application 202 will still continue to make file system requests (e.g., via function/method calls) through an API layer 204 to an I/O manager 206. As is known, the I/O manager 206 generates an IRP or other type of I/O, and sends the I/O to the top of the (legacy) filter driver stack 208. As described below, one of the components in the stack 208 is a filter manager 212.

In general, the filter manager 212 translates the I/O, whether an IRP, fast I/O, FS Filter callback or the like into a uniform structure known as callback data. A suitable callback data structure is described below. The filter manager 212 then walks through a list of registered filter drivers (e.g., five such filter drivers $282_A$-$282_E$ are shown in FIG. 2, although there may be any practical number of such drivers), and for each filter driver, may invoke a registered dispatch for the I/O. Significantly, in the model of the present invention, filters do not receive and/or handle IRPs, but instead essentially instruct the filter manager 212 on what to do with the I/O request.

As also represented in FIG. 2, legacy filter drivers 210 may still be supported in this implementation, such as by placing them at the top of the stack 210. Note however that it is feasible to arrange them in some other order relative to other stack components. For example, since legacy filter drivers are arranged to handle IRPs, not callbacks, special management code may surround such a legacy filter to generate an IRP from callback data to pass to it and receive the (possibly modified) IRP from it and convert it back to a status response. In this manner, a legacy filter can be inserted and isolated within the callback model. In any event, legacy filters may still be used in the new model.

To summarize the implementation shown in FIG. 2, the file system filter manager 212 is employed in the new model, and placed into the filter driver stack 208 as if it is a legacy filter driver, so that it can receive and process IRPs. Note that this allows the filter manager to simply work in an existing I/O system, however it can be appreciated that an equivalent model (e.g., without higher legacy filters) can be provided in which an updated I/O manager passes I/O data to a filter manager in something other than an IRP data structure. For example, when the I/O manager generates an IRP, the filter driver generates a callback data structure from the IRP, and thus it may be more efficient to have the I/O manager directly generate the callback data structure. Note that something other than an IRP is already provided in existing systems for fast I/O, memory manager callbacks and so forth, which for faster performance are callback-based rather than packet-based, for some common I/O tasks such as read/write/device I/O controls. Further, note that in existing systems, fast I/O is still passed through the stack (that is, chained), and is thus not like the callback-based model of the present invention. For purposes of simplicity, the present description will primarily use the example of an IRP, except where otherwise noted.

In one implementation, filter drivers comprise objects or the like that when instantiated, typically during their driver initialization procedure, register with a registration mechanism in the filter manager 212. For efficiency, the filter drivers typically will only register for file system requests in which they may be interested in processing. To this end, as part of the registration, each filter driver notifies the filter manager for the types of I/O requests in which it is interested (e.g., create, read, write, close and so forth). For example, an encryption filter driver may register for read and write IRPs, but not for others wherein data does not have to be encrypted or decrypted. Similarly, a quota filter may be interested only in file creates and file writes. As a result, the model is more efficient than a stacked filter model, because filter drivers only see the I/O for which they have registered.

To enable attachment to volumes, the model of the present invention defines the concept of an "instance" of a filter driver (and also a volume context as described below). More particularly, filter drivers that wish to attach to a volume are notified via an instance setup notification when a new volume is mounted. A similar notification is provided for volumes that have already mounted before a filter driver is loaded. Filter drivers can then choose to attach to the volume via registration, described below, and if so, an instance object is used to represent the instance of the attachment. Filter drivers are similarly notified when a volume dismounts, namely through an instance detach notification. The present model also allows for filter drivers to dynamically detach from a mounted volume.

A filter driver may be associated with an altitude which indicates where in the callback order that driver is located, such as generally described in U.S. patent application Ser. No. 09/768,098 entitled "Method and System for Deterministic Ordering of Software Modules." Moreover, as represented in FIG. 3, filter drivers can attach multiple times to the same volume, creating an instance for each attachment, (although to do so, each instance for the same volume is necessarily at a different altitude, whether by an order number or by some override mechanism).

Figure 3:
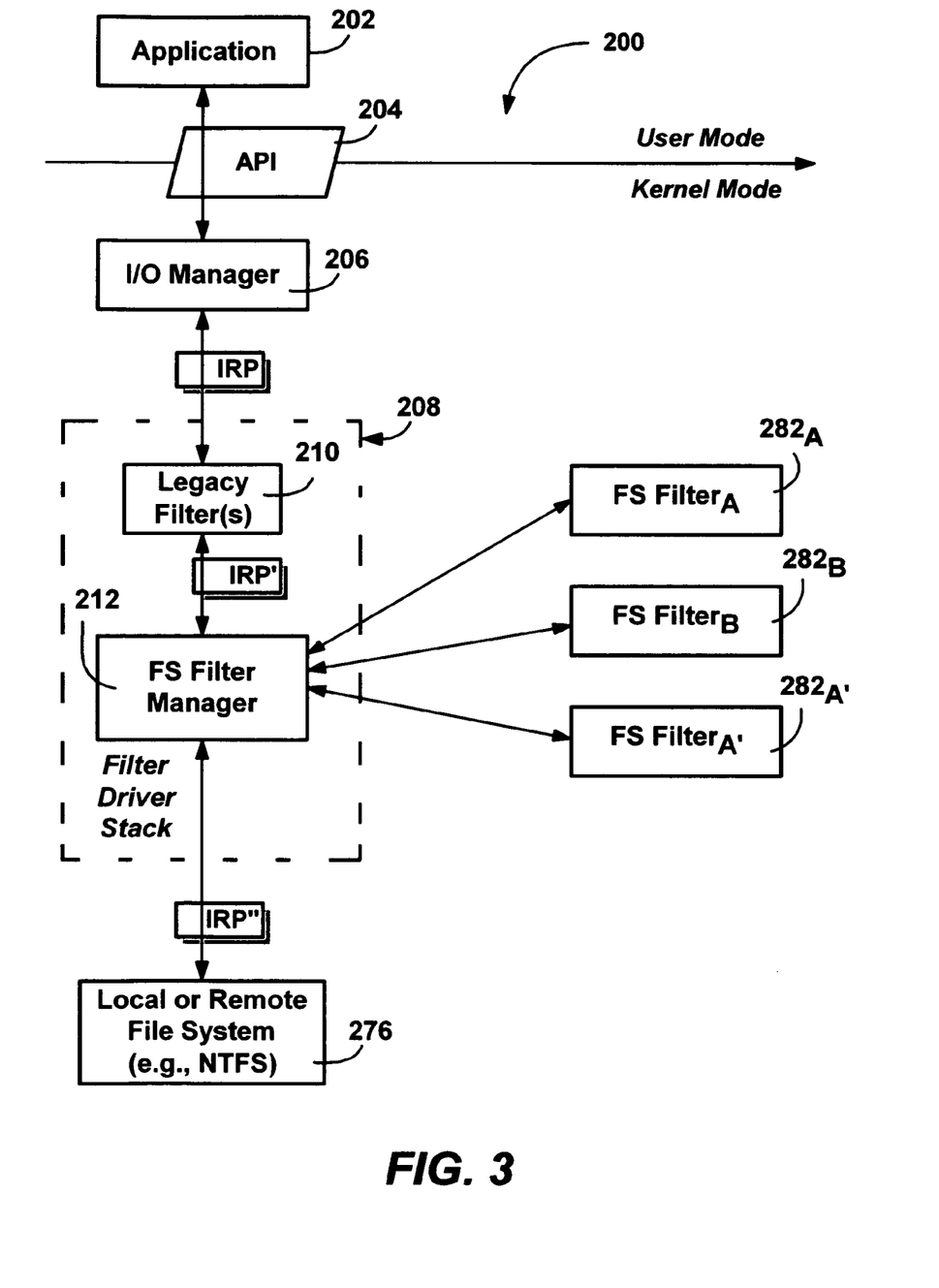
FIG. 3 is a block diagram generally representing instances of managed filters in accordance with an aspect of the present invention.

FIG. 3 shows an example filter that has multiple instances. In FIG. 3, filter A, e.g., a "filesystem activity monitoring" filter, monitors file I/O, and has two instances, filter A and filter A'. In this manner, a file activity monitoring product is able to observe (via filter A) I/O going in to an intermediate (e.g., anti-virus) filter B, as well as observe (via filter A') the I/O that eventually passes through that intermediate filter on its way towards the file system. For example, the file activity monitoring product may include a user mode program (not separately shown) which both filter A and filter A' report to, via messages as described below.

Thus, per-volume filter driver instances may be associated with an altitude that determines where each instance is located for that volume. Altitudes may be pre-assigned to a given filter instance, such as in U.S. patent application Ser. No. 09/768,098, and/or a flag mechanism or the like (described below) may be used to derive an appropriate altitude for a filter. For example, an antivirus filter should not be allowed to attach between an encryption filter and the base file system, since it needs to see the data as is, prior to encryption. Flags can indicate whether a filter inspects data (e.g., an antivirus filter), modifies data, (e.g., an encryption filter), and so forth, from which an altitude may be derived. In this manner, the callback order is not based on the order in which drivers are loaded, but rather on some predetermined, logical basis.

In accordance with one aspect of the present invention, filter drivers register two kinds of callbacks, namely pre-callbacks and post callbacks. The pre-callback is called on the I/O's way down, that is, towards the file system, while the post-callback is called during the completion of the I/O, on the way back up from the file system towards the I/O manager.

Figure 4:
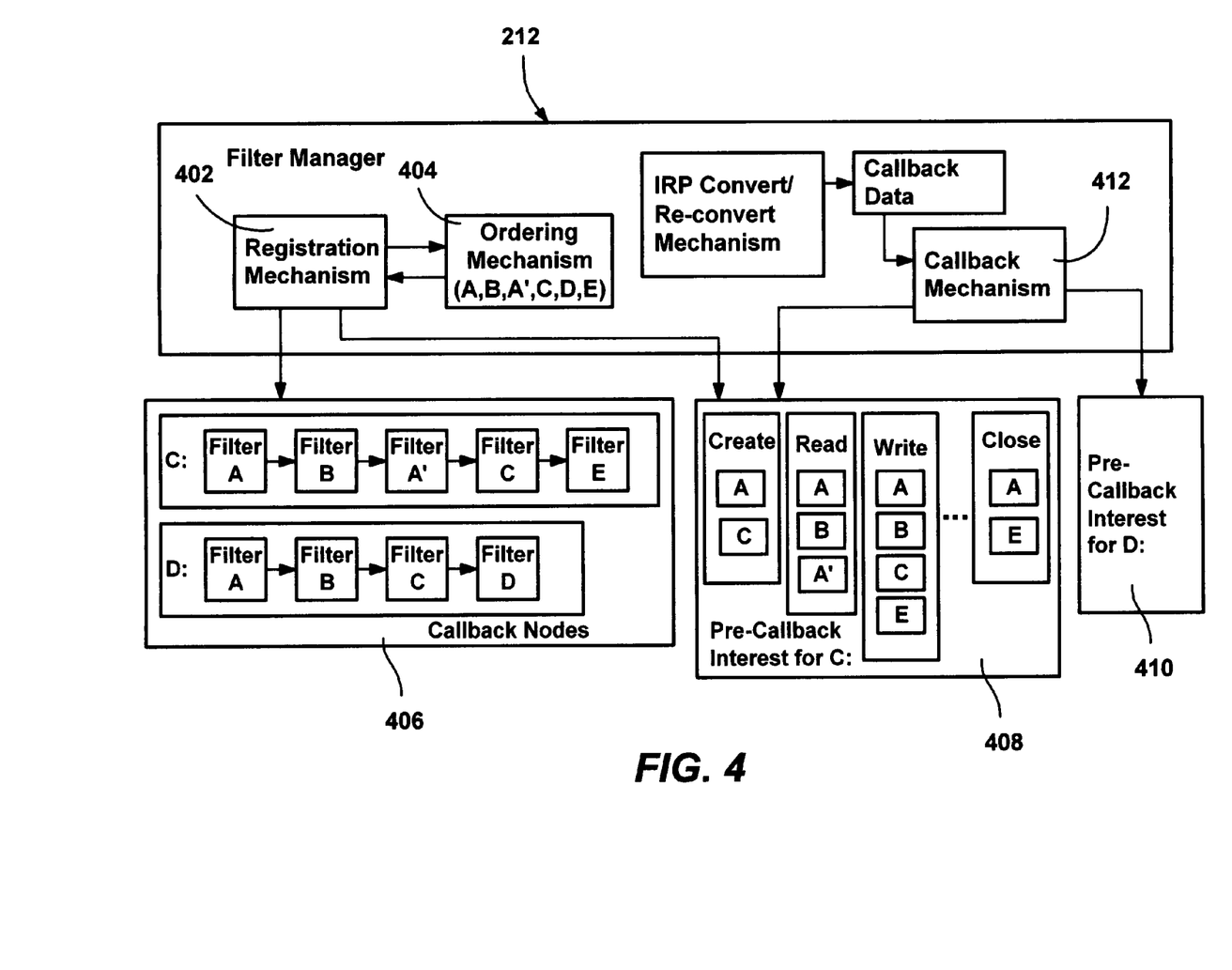
FIG. 4 is a block diagram generally representing data structures used by a filter manager to selectively pass I/O to appropriately registered filters in accordance with an aspect of the present invention.

For efficiency, to track which filter drivers have registered for which types of callbacks and thereby efficiently determine which filter drivers to call when I/O (e.g., an IRP) is received, the filter manager 212 maintains one or more per-volume data structures. For example, as represented in FIG. 4, when a filter instance registers at a registration mechanism 402 (e.g., by calling a function) in the filter manager 212, the registration mechanism determines, via an ordering mechanism 404 where in the pre-callback order the filter instance belongs. The ordering mechanism 404 may be based on a simple comparison of altitudes, or may include logic that evaluates flags to determine where the filter instance fits in. In any event, per-volume callback nodes are maintained, with the registration information therein.

As described below, part of the information sent to the filter manager in registration comprises (e.g., in an array) a list of the file system requests for which a filter instance wants a pre-callback. This information is used to construct a per-volume ordered list 408 (e.g., volume c:) or 410 (e.g., volume d:) or the like by which a callback mechanism 412 in the filter manager 212 can efficiently determine the order for calling each instance. For example, as represented in FIG. 4, if a read request for a file on the c: volume is received, the filter instances interested in read (as indexed by IRP major code of the IRP) may be quickly obtained, e.g., filter instance A, filter instance B and filter instance A' will be the pre-callback order, as represented in the example in FIG. 4. Note that this is highly efficient, and also facilitates dynamic registration; at any time a new filter instance registers, the registration mechanism can rebuild the lists as appropriate.

In this manner, the pre-callback order is determined per type of file I/O request, although as described below, the status returned by each filter instance may impact the actual filter instances that receive callbacks, e.g., a filter can fail a callback. Post-callback works essentially in the opposite order, however as described below, one of the status values that a called instance can return in a pre-callback is success without a post callback, in which case the filter manager 212 will skip the post callback for that instance.

The status values that a filter instance may return in response to a callback generally include success without callback, success with callback, pending, synchronize, complete, and disallow fast I/O. In one particular implementation "FLT_PREOP_SUCCESS_NO_CALLBACK" continues processing the I/O pass through, as does the status "FLT_PREOP_SUCCESS_WITH_CALLBACK," which further requests a completion callback when this I/O completes. A filter can also specify FLT_PREOP_PENDING, which holds the I/O until the filter later calls FltCompletePendedPreOperation( ). FLT_PREOP_SYNCHRONIZE waits for the I/O to complete, and calls post-callback in the original thread context. The I/O synchronization is handled by the Filter Manager. Note that "pending" and "synchronize" cannot be returned with fast I/O. FLT_PREOP_COMPLETE completes the I/O with either a success or failure status code (which is generally analogous to an IoCompleteRequest in a legacy dispatch). FLT_PREOP_DISALLOW_FAST_IO is valid only for Fast I/O, and is generally equivalent to returning FALSE in a legacy dispatch.

In this manner, the managed filter driver model allows filter drivers to control the execution path of the I/O via the return status from their pre-callback routine. This allows filter drivers to request different ways for the I/O to be handled, including pended, completed, passed on to lower filters, request a post-callback, request a 'synchronized' post-callback and so forth.

As described herein, filter instances register for post-callbacks. In response to a post callback, a filter instance (e.g., that previously returned a status of FLT_PREOP_SUCCESS_WITH_CALLBACK) can return a status of FLT_POSTOP_FINISHED_PROCESSING to continue I/O completion, or FLT_POSTOP_MORE_PROCESSING_REQUIRED to abandon completion and complete I/O later by calling a FltCompletePendedPostOperation( ) function. A filter can reissue an I/O during its post-operation processing via the FltReissueSynchronousIo( ) function call for reparse handlers. A FLT_POSTOP_UNDO_CREATE status is provided for filters that want to block file opens by failing the create request.

Figure 5:
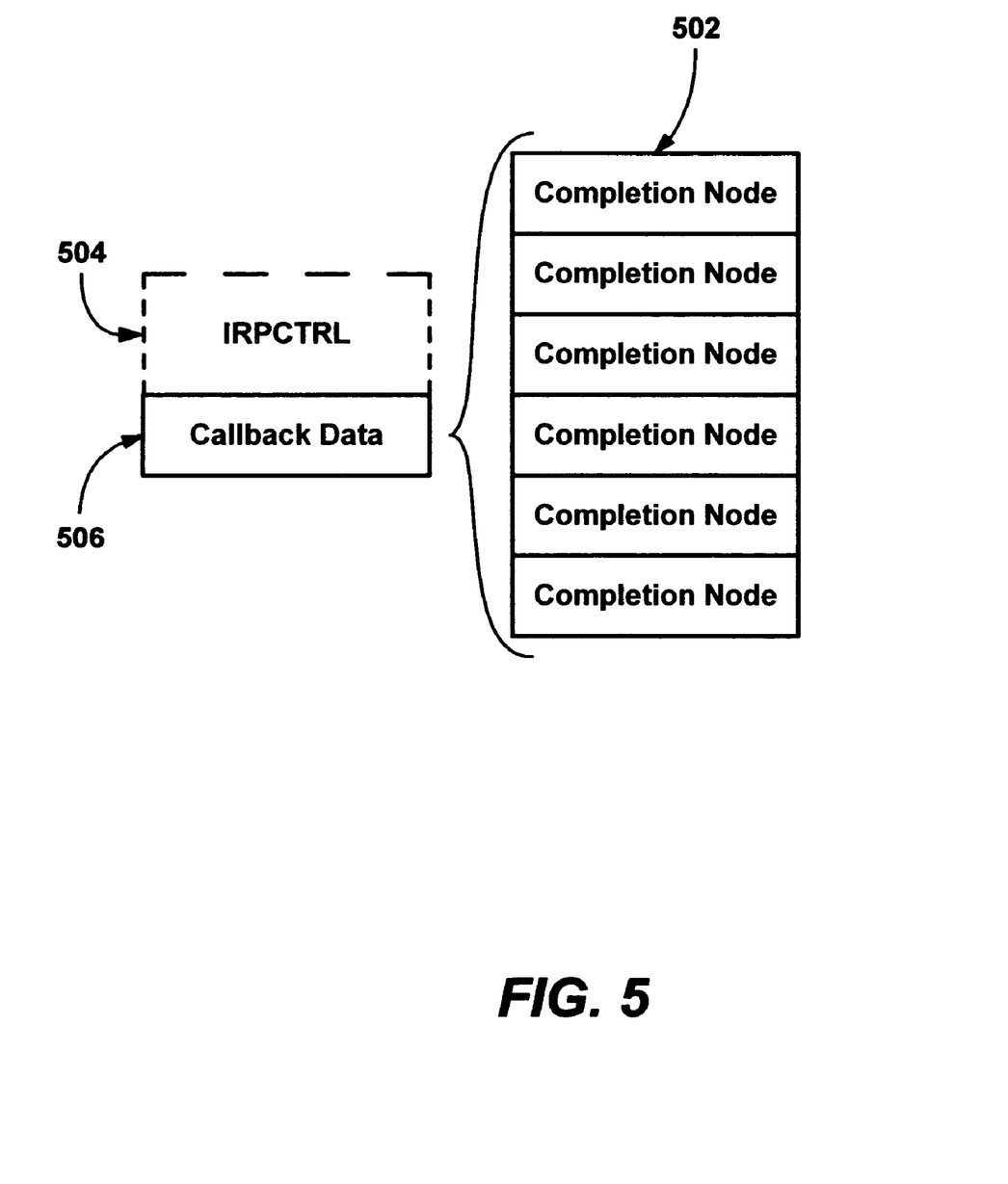
FIG. 5 is a representation of a stack of completion nodes for returning callback data to registered filter drivers in a post-callback operation in accordance with an aspect of the present invention.

I/O completion is handled by the filter manager 212 in a manner that guarantees that the parameters seen by a filter instance in its pre-callback are the same in its post-callback. Note that this is an improvement over the legacy stacked model in which filters often changed parameters, buffer pointers and so on, leading to numerous problems. In general, this is performed as represented in FIG. 5, wherein the filter manager maintains a completion node for each instance, (that is, at least for those instances receiving callbacks).

In essence, for each instance called in a pre-callback that has (via its status) requested a callback, the filter manager takes a snapshot of the parameters before each pre-callback, stores the snapshot in the completion node, and pushes the completion node onto a stack 502. To manage the post-callback data, for each IRP, the filter manager maintains an IRPCTRL header 504, not seen by the filter driver, that tracks information including the device object, an IRP pointer, node information including the size of the completion nodes and its corresponding instance, and so forth. Then, during post-callback, the filter manager essentially walks backwards, popping each completion node off of the stack 504 and putting the completion node data into the callback data 506 for that instance, thereby restoring its parameters. Note that the stack can be copied to another stack with an added completion node if a filter instance registers dynamically before it is pre-called in the order; if registered after the pre-calling has already passed it in the pre-calling order for a given IRP, that instance would not be called back.

For efficiency, the stack only needs to have a completion node pushed onto the stack when a filter instance is to receive a callback, and when a filter instance makes a change to the callback data, since otherwise the same completion node can be reused. A filter instance is responsible for setting a "dirtied" parameters flag when it modifies the data. Note that if it does not do so, its changes will be discarded and it will not have its changed data snapshotted, whereby any changes would not be seen by another driver.

Returning to FIG. 2, after the last post-callback is made, the filter manager 212 reconverts (marshals) the callback data into an IRP and returns the IRP up the stack towards the I/O manager 206, through any higher legacy filters 210. As can be appreciated, with this managed filter model many of the drawbacks of the legacy model are eliminated or significantly reduced.

In addition to the above functions, the filter manager also provides a rich API set that provides functions which filters commonly need. For example, certain filters need to perform I/O of their own, e.g., an anti-virus filter may wish to read a file before it is opened. When a filter driver wishes to initiate its own I/O operation, it first calls FltAllocateCallbackData( ). This function allocates and returns an FLT_CALLBACK_ DATA structure, which the filter then populates with any relevant fields. Note that FltAllocateCallbackData is essentially the replacement for calling IoAllocateIrp( ) in the legacy system. When the filter is ready to send the I/O request on to any remaining filters, legacy filters, and the base file system, it calls FltPerformSynchronousIo( ) or FltPerformAsynchronousIo( ) (analogous to IoCallDriver( )). By default, filter-initiated I/O is sent to the next attached filter for the given volume, bypassing any filters attached above the filter initiating the I/O. It is possible, however, to send I/O to any device in the system, as a hierarchical storage management (HSM) filter might need to do.

As another example, filters sometimes need to create a file, and the FltCreateFile( ) function is provided as a starting point for initiating I/O. This function returns a handle that can be used with existing operating system APIs that take file handles, and allows file create on other instances. The function supports share-access override. Further, the filter manager ensures that any callbacks are only seen by filters below the requesting filter, including those dynamically inserted, which, as can be appreciated, avoids recursive callbacks. To this end, the filter manager creates a file with an instance hint, and uses this hint to identify the requesting filter. Note that mount point opens are an exception, as they need to go to top of the callback stack.

FltReadFile( ) allows synchronous and asynchronous I/O, with filter-supplied callback that will be issued on I/O completion. FltWriteFile( ), FltSetInformationFile( ) and so forth have similar semantics. FltAllocateCallbackData( ) allows I/O to be customized, including FltPerformSynchronousIo( ), or FltPerformAsynchronousIo( ) which accepts an I/O completion callback.

Context management is another example where filter manager-provided APIs are highly beneficial, as filters often need to associate a context structure with each stream handle, stream, instance and volume. For example, filters use the contexts to store per handle/per stream/per file/per volume/ per instance information that is looked up when a filter intercepts I/O. Any context or contexts that a filter has set on an entity will be passed to the filter when that filter requests it, e.g., via an API. The context lifetime is managed by the filter manager 212, and filters will be called back when the context is deleted due to the appropriate object (such as stream/file/ instance/volume) being deleted.

In accordance with another aspect of the present invention, the filter manager 212 provides efficient context support to store context data (e.g., pointers or the like) for each filter in the appropriate object, that is, for a stream handle, stream, file, instance or volume. To this end, the present invention provides context support, via a set of APIs that return context to an entity, and thus simplifies the association of a per-filter context with that entity. Contexts may be set and/or reset any time. The present invention also provides notification support for instances, via a set of callbacks that setup notification for an instance.

The types of entities include instances, volumes (a local disk volume, or a remote network share), streams (for file systems that support multiple streams per file), stream handles (per-file objects), and files (e.g., all streams of a file). With respect to instances, as described above, when a filter attaches to a volume, an instance is created, and, as also described above, there may be more than one instance of a given filter for a given volume, e.g., attached both above and below another filter on the same volume. Each instance can have a context associated, for example to point to a private log for that instance. A volume context can be shared among filter instances.

To associate a context with an object, the filter calls FltAllocateContext( ) specifying the type of context (stream handle, stream, file, instance or volume), the size of context and whether the context should be allocated from paged or non-paged pool memory. Once the context is allocated and initialized, the filter associates the context with the object by calling the appropriate routine: FltSetStreamHandle Context( ), FltSetStreamContext( ), FltSetFileContext( ), FltSetInstanceContext( ) or FltSetVolumeContext( ).

Figure 6:
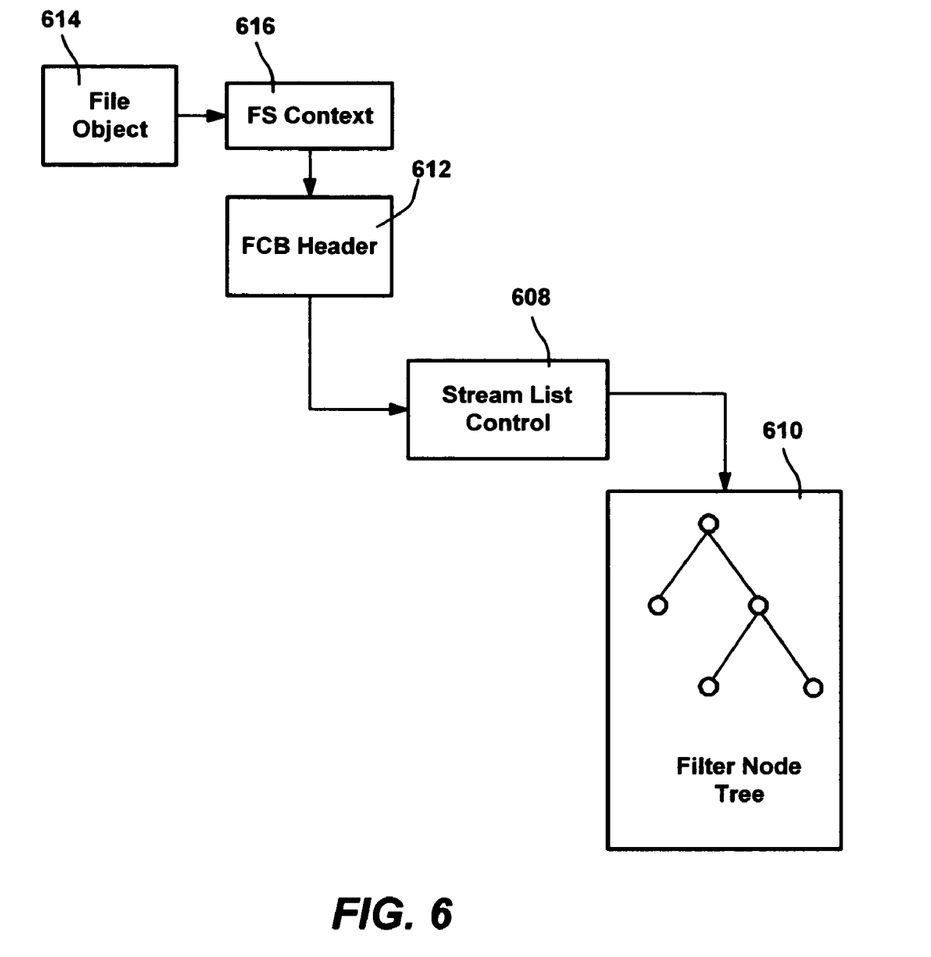
FIG. 6 is a block diagram representing a tree for efficient determination of which instances have context data in accordance with an aspect of the present invention.

As represented in FIG. 6, to efficiently look up the filter instances associated with files, streams and stream handles, the filter manager 212 adds a tree (e.g. a splay tree) to the data structures associated with the file object. More particularly, the operating system facilitates the adding of arbitrary context to a stream, and the filter manager 212 uses this mechanism to add a stream control list 608 and a tree 610 to the FSRTL_ ADVANCED_FCB_HEADER 612, which essentially is pointed to by the file object 614 via its context 616. Each node in the tree 610 represents a filter instance that has an associated context for this stream. Although not separately shown, there may be parallel trees, one for paged-pool memory and one for non-paged pool memory, as specified by the filter instance for different types of access that may be needed.

Figure 7:
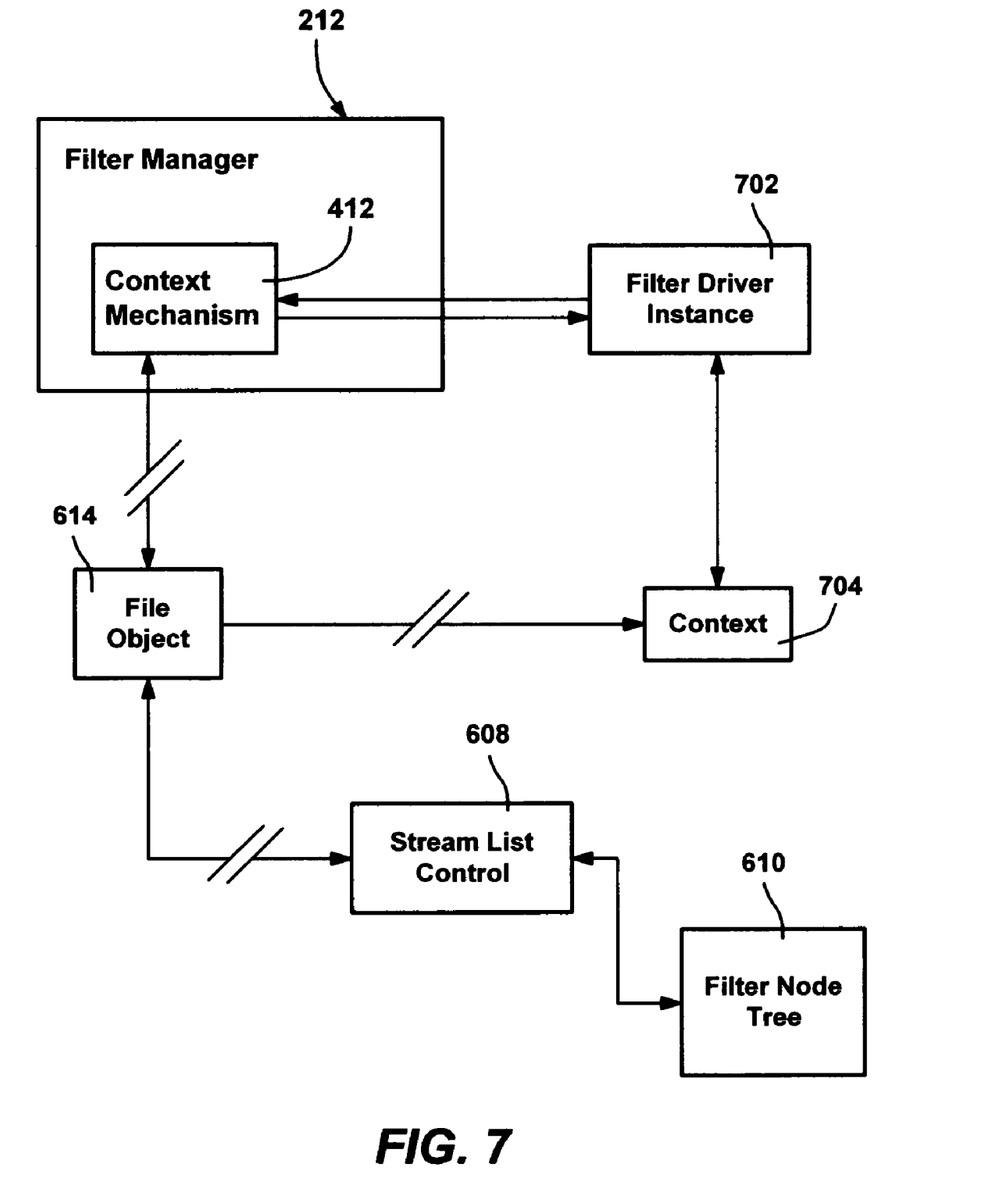
FIG. 7 is a block diagram representing the returning context data to a filter driver in accordance with an aspect of the present invention.

For a given stream handle, each node in the tree is accessed by keys, including the file object as one key and the instance as another. Note that for streams, the file object key is NULL. As represented in FIG. 7, when provided with these keys, such as via data in a function call to a context mechanism 412 within (or associated with) the filter manager 212, the appropriate node in the tree 610 can be quickly located for the filter driver instance 702, and the appropriate context 704 (e.g., in the form of a context pointer) returned to the requesting filter driver instance 702. In part the traversal is fast because there are not generally that many filter instances in a given configuration.

In one implementation, a filter may receive a notification for an instance:

```
typedef PVOID PFLT_CONTEXT;
NTSTATUS
(*PFLT_INSTANCE_SETUP_CALLBACK) (
    IN CONST PFLT_RELATED_OBJECTS FltObjects,
    IN FLT_INSTANCE_SETUP_FLAGS Flags,
    IN DEVICE_TYPE VolumeDeviceType
    );
```

If context is needed for a particular instance, it can set it in this callback. The context is a PVOID, and the system will treat it as completely opaque, so a filter can use it to store a flags field, a counter, a pointer, or anything else it needs. If the filter was able to successfully initialize its instance callback and would like to monitor activity on this volume, it should return STATUS_SUCCESS. If the filter does not want this instance to be created on this volume, STATUS_FLT_DO_NOT_ATTACH should be returned. Notification cleanup callbacks for instances are provided to properly synchronize instance teardown as new operations may be coming to the volume, and include InstanceQueryTeardown, InstanceTeardownStart and InstanceTeardownComplete.

A filter that provides a context structure for some entity will have its corresponding ContextCleanupCallback called. In other words, to avoid leaking memory pool, a filter does not need to keep track of which contexts it has allocated, as the system will take care of when cleanup should occur. When a context should be freed, the system calls the filter's ContextCleanupCallback. During this callback, the filter is responsible to uninitialize the contents of the context and upon return the system will free the memory allocated by the filter's earlier FltAllocateContext( ) call. Cleanups are assumed to succeed; therefore there need not be a return value. The system also guarantees that the context cleanups routines will be called at an IRQL low enough that pool frees can be done safely.

An instance context gets cleaned up when the filter is detached from the volume. A volume context gets cleaned up after the volume is dismounted, and after all files, streams, and stream handles for the volume are cleaned up. Due to memory manager, cache manager, and file system implementation details, the volume context may not be cleaned up for a relatively long time after the volume is dismounted.

A file context gets cleaned up when the file system frees the memory associated with the file, which in a multiple-stream file system, will be after the last stream handle for the last stream for that file is freed. Note that because the operating system's memory manager and cache manager may still have references to one or more streams in the file, the file context may not be cleaned up for a relatively long time after the last user handle to the stream is closed. Similarly, a stream context gets cleaned up when the file system frees the memory associated with the stream, which will be after the last stream handle for that stream is freed. Again, because the operating system's memory manager and cache manager may still have references to one or more streams in the file, the stream context may not be cleaned up for a relatively long time after the last user handle to the stream is closed.

A stream handle context gets cleaned up when the last reference to the stream handle is released. This may be as a result of the user handle being closed, or the last memory manager or cache manager reference being released.

A context can be set for an object if the object does not currently have a context, or a context can be changed. A filter can clear a context using one of the following routines, as appropriate: FltDeleteContext( ), FltDeleteVolumeContext( ), FltDeleteInstanceContext( ), FltDeleteFileContext( ), FltDeleteStreamContext( ) and FltDeleteStreamHandleContext( ).

Often a filter will want some basic information about an entity to decide if it is interested in it. For a volume, this might be the file system, whether the volume is local or remote, whether it is on removable media, and so on. For a file, this may include the file's name, timestamps, size, extension, and so forth. The system may expose functions (e.g., FltGetFileInformation( ), FltGetVolumeInformation( )) to conveniently retrieve this information. The filter may also wish to call FltTagFile( ) to set a reparse point on a file.

Yet another set of APIs provide by the architecture of the present invention, are directed towards facilitating communication between filter instances and user mode code. More particularly, many filters have a user-mode service counterpart that is typically the administrative component of the product, and filters need to communicate with the service. The present architecture may provide APIs for these products to use for both user-mode initiated as well as kernel-initiated communication.

For example, for filters that communicate with a user-mode component, a library is available for those user-mode applications. The library exposes routines, including routines to load and unload filters, attach and detach filters to volumes, open communication channels to filters from user-mode and send/receive data from the filters, and query the system for information on the current status of the system. For example, a user mode program may query for which filters are currently loaded, what instances exist on a given volume or for a given filter, and so forth. Note that that filter-user communication is different from the administration APIs that are provided which allow enumeration of filters/instances, unloading/loading filters and so forth, as the filter-user communication APIs are for use by filters to do their own private communication.

In summary the new filter model provides a way to write reliable, efficient, file system filters allowing dynamic load/unload, dynamic attachment/detachment to volumes, flexible ordering, and access to a rich set of APIs that filters most commonly need. The following provides specific details for one example implementation that is based on the Windows® NT/2000/XP operating system.

Example Implementation

The following describes some of the filter-initiated operations performed via function calls, including registration with the filter manager:

Filter declares callbacks for interesting I/O:

```
FLT_OPERATION_REGISTRATION Callbacks[] = {
    { IRP_MJ_CREATE,
      0,                      // Flags
      AvCreate,               // pre-callback
      AvCreateCompletion},    // post-callback
    { IRP_MJ_WRITE,
      0,
      AvWrite,
      AvWriteCompletion}, ...
};
```

Filter Declares a Registration Structure:

```
const FLT_REGISTRATION FilterRegistration = {
    ... *
    AvUnload,                    // Unload routine
    AvInstanceSetup,             // Instance Setup
    AvInstanceQueryTeardown,
    AvInstanceTeardownStart,
    AvInstanceTeardownComplete,
    ......
    Callbacks,                   // Operation callbacks
};
```

Filter Registers with Filter Manager:

```
status = FltRegisterFilter( DriverObject,
                            &FilterRegistration,
                            &AvFilterHandle );
```

Filter Get Pre-Callbacks:

```
FLT_PRE_OPERATION_CALLBACK_STATUS
AvWrite (
    IN OUT PFLT_CALLBACK_DATA Data,
    IN CONST PFLT_RELATED_OBJECTS FltObjects,
    OUT PVOID *CompletionContext
);
```

In this example implementation, file system filter drivers comprise NT kernel-mode drivers, and as such are required to export a function called DriverEntry( ), which is the first function invoked when the driver is loaded. When loaded, filters call a function to register named FltRegisterFilter( ) in their DriverEntry( ). FltRegisterFilter( ) takes as a parameter an FLT_REGISTRATION structure, which contains (among other things) instance setup and teardown callbacks, a list of context callback function pointers, and a list of callback pointers for file system operations. Note that in many scenarios in which a filter wishes to hook only a relatively few number of operations, and is only interested in setting contexts for few, if any, objects, this list may be very short.

In one alternative implementation, there may be a flags field in which a filter sets one or more filter attribute flags from which an altitude may be derived. For example, a flag may be set by a filter that modifies data, such as for an encryption or compression filter to notify the system that it modifies data on the way to and from the base file system. In this implementation, any filter that splits a user's data into multiple streams also should set this flag. Filters can also set a flag to indicate that the filter examines data, e.g., a virus filter that that needs to see plaintext, uncompressed data would set this flag. Flags are also available for filters that modify standard information (such as timestamps and dates), for filters that examine standard information, (e.g., to perform different operations on a file based on its date), for filters that redirect a create to a file/stream of a different name (e.g., a symbolic link/SIS type filter), and for filters that rely on file names, (such as a virus filter that scans .EXE and .DOC files).

As described above, these flags may be used to help the system attach filters to a volume in the correct order. For example, an antivirus filter should not be allowed to attach between an encryption filter and the base file system, since the antivirus filter needs to see the data as is, prior to encryption. To prevent this, the model does not allow a filter having a flag that indicates that the filter examines data flag set to attach above a filter with a flag set that indicates that the filter modifies data. Further, certain combinations of these flags may be used to prevent a filter from attaching, e.g., if two filters set flags indicating that each filter both examines and modifies data, there is no order in which both filters can be safely attached to the same volume.

The following sets forth one logical ordering for types of file system filter drivers:

Activity Monitor (file spy etc.)
Undelete
Anti-virus
Replication
Continuous backup
Content screener
Quota management
Cluster file system
HSM ($3^{rd}$ party hierarchical storage management)
Compression
Encryption
Physical Quota Management
Open File backup (snapshots of open files)
Security Enhancer
Copy protection
System
Filter Infrastructure (filter manager)

As described above, callback data is a unit of I/O representation, somewhat analogous to an IRP, for the purpose of representing the necessary information that describes the operation to the filter driver. The callback data contains normalized parameters, specialized to the file system filter's uses, and exists for Fast I/O, IRP and FsFilter calls. The changeable parameter section can be modified (that is, dirtied) by the driver, and the parameter section is honored by filter manager from filter to filter via the completion node stack popping operation, described above.

The following is an example callback data structure:

```
typedef struct _FLT_CALLBACK_DATA {
    ... *
    FLT_CALLBACK_DATA_FLAGS Flags;
    //
    //   Thread that initiated this operation.
    //
    PETHREAD Thread;
    PFLT_IO_PARAMETER_BLOCK Iopb;
    IO_STATUS_BLOCK IoStatus;
    ... * *
    // other data: reparse data buffer, queue links,
    // context area for filters
    ... *
}   FLT_CALLBACK_DATA, * PFLT_CALLBACK_DATA;
```

The following is an example I/O parameter block:

```
typedef struct _FLT_IO_PARAMETER_BLOCK {
    ...........
    UCHAR MajorFunction;
    UCHAR MinorFunction;
    .............
    PFILE_OBJECT TargetFileObject;
    PFLT_INSTANCE TargetInstance;
    //
    //   Normalized parameters for the operation
```

```
    //
    FLT_PARAMETERS Parameters;
} FLT_IO_PARAMETER_BLOCK, *PFLT_IO_PARAMETER_BLOCK;
```

Pre-Operation Callbacks have the Same Signature:

```
FLT_PREOP_CALLBACK_STATUS
    (*PFLT_PRE_OPERATION_CALLBACK) (
        IN OUT PFLT_CALLBACK_DATA Data,
        IN CONST PFLT_RELATED_OBJECTS FltObjects,
        OUT PVOID *CompletionContext);
```

As described above, pre-operation callbacks may return one of the following statuses (and others) for FLT_PREOP_CALLBACK_STATUS:

```
FLT_PREOP_SUCCESS_WITH_CALLBACK - the operation succeeded,
and the filter wants to have its post-operation callback
called
FLT_PREOP_SUCCESS_NO_CALLBACK - the operation succeeded,
but the filter does not want to have its post-operation
callback called
FLT_PREOP_PENDING - the filter driver will complete the
operation (by calling FltCompletePendedPreOperation ( ))
sometime in the future
FLT_PREOP_COMPLETE - the filter has completed the
operation. An operation can be failed by setting an error
status and return this callback status.
FLT_PREOP_SYNCHRONIZE - the filter wants the completion
processing performed in the same thread context that the
pre-operation callback was performed in; the thread
originating this I/O will not be returned to until this I/O
is completed.
FLT_PREOP_DISALLOW_FASTIO - the filter wants to disallow
the given FastIo operation; This indicates the fast I/O
path is disallowed, but the I/O manager will use the
regular IRP path to complete the I/O.
```

Post-Operation Callbacks have the Same Signature:

```
FLT_POSTOP_CALLBACK_STATUS
    (*PFLT_POST_OPERATION_CALLBACK) (
        IN OUT PFLT_CALLBACK_DATA Data,
        IN CONST PFLT_RELATED_OBJECTS FltObjects,
        IN PVOID CompletionContext,
        IN FLT_POST_OPERATION_FLAGS Flags);
```

The Flags May Include:

```
FLTFL_POST_OPERATION_DRAINING - If set, the given instance
is being detached and this post-operation routine is being
called for cleanup processing.
```

FTL_POSTOP_CALLBACK_STATUS:

```
FLT_POSTOP_FINISHED_PROCESSING - the filter has completed
processing the operation
FLT_POSTOP_MORE_PROCESSING_REQUIRED - the filter driver
will complete the operation (by calling
FltCompletePendedPostOperation) sometime in the future
FLT_POSTOP_UNDO_CREATE - the filter wants to undo the given
create operation
```

A filter will receive a completion callback per pre-operation callback. For instance, if memory is allocated in the pre callback, a filter can be assured it will be given a chance to free it in the completion callback, and that the completion callback won't be called more than once to provoke the filter to free the memory more than once.

The operations for which pre- and post-callbacks may be provided include the existing IRP_MJ_codes from IRP_MJ_CREATE to IRP_MJ_PNP, IRP_MJ codes created to represent fast I/O operations for which there is no IRP equivalent, and IRP_MJ codes created to represent FS filter operations. If future operating system versions add new IRP_MJ_codes, existing filters will be unaffected, and will not receive any callbacks for IRP_MJ_ routines that did not exist when the filter was compiled. If a filter registers with an IRP_MJ_code that the operating system does not recognize, FltRegisterFilter( ) will return a special success status, and only call the callbacks for functions that exist in that version. If a filter does not want to continue to run if one or more callbacks will not be provided, the filter can call FltUnregisterFilter( ).

Note that the callbacks for IRP_MJ_READ and IRP_MJ_WRITE will be invoked for IRP-based I/O and for fast I/O. The pre-callout for IRP_MJ_CREATE will not be passed contexts for the file or stream, as it is not yet determined at pre-create time what file or stream (if any) is going to be created. The post-callout for IRP_MJ_CLOSE will not be passed any contexts, as the system-internal structures with which they are associated are freed before the post-close routine is called. The pre-callbacks for IRP_MJ_CLEANUP and IRP_MJ_CLOSE must succeed and return FLT_PREOP_SUCCESS_WITH_CALLBACK or FLT_PREOP_SUCCESS_NO_CALLBACK.

The post-operation callbacks have the potential to be called at DPC level, and therefore they should not wait for resources or mutexes, nor should they call any function that would wait. Note that routines such as FltSetFileContext( ) acquire resources and thus may not be called from post-operation callbacks.

As described above, post callbacks return either FLT_POSTOP_STATUS_SUCCESS or FLT_POSTOP_MORE_PROCESSING_REQUIRED. Post-callbacks can be failed by setting an error code in the IoStatus, and in general the rule is that it is the filter's responsibility to undo what ever has occurred.

In addition to dynamically registering filter instances, filter instances may be dynamically detached, whereby such a filter instance will no longer be called for any operations on that volume. Unloading a filter essentially means that its code is no longer in memory. This will most often be done at system shutdown time and when a new version of a filter is being installed without shutting the system down. Note that a filter instance can be detached even when there is outstanding I/O. In that case, the filter's completion routine or routines will be called for any outstanding I/O operations with the flag FLT-FL_POST_OPERATION_DRAINING set. The fiter will not receive completion callbacks when those I/O operations actually complete. When a filter instance is detached, the system will call routines to free the filter's context, for outstanding contexts for files, streams, and stream file objects associated with that instance.

As can be seen from the foregoing detailed description, there is provided a managed filter driver architecture that handles much of the I/O handling requirements, thereby facilitating simpler and more reliable filter drivers. The drivers may selectively register for only the I/O in which they are interested, improving efficiency. Dynamic load and unload, attach and detach are achieved. Other benefits include context management, including on file systems with multi-stream capabilities. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment having an operating system and a file system, wherein the operating system includes a component that receives file system-related function calls and provides corresponding I/O request data directed to the file system, a system comprising:
    a processor and memory, the memory storing:
        a plurality of filter drivers; and
        a filter manager that:
            a) registers each of the filter drivers;
            b) arranges the filter drivers in at least one pre-callback order, each pre-callback order corresponding to a set of one or more of the filter drivers;
            c) receives the I/O request data, the I/O request data comprising one of an I/O Request Packet (IRP), fast I/O paths, or Fs Filter callbacks;
            d) calls at least one of the filter drivers based on a selected pre-callback order, including providing callback data based on the request to each filter driver called, the callback data comprising a conversion of the I/O request data into a uniform structure, wherein the filter manager is configured to convert each of IRPs, fast I/O paths, and Fs Filter callbacks into callback data having the uniform structure;
            e) receives a status from each filter driver called; and
            f) after calling and providing the callback data to the at least one of the filter drivers, converts the callback data back to I/O request data and passes the I/O request data towards the file system including data corresponding to the callback data.

2. The system of claim 1 wherein the I/O request data comprises information in an I/O request packet, and wherein the filter manager converts the I/O request packet to callback data by passing explicit context to the first filter driver based on implicit information in the I/O request.

3. The system of claim 1 wherein the selected pre-callback order includes a first filter, an intermediate filter and a last filter, the first filter ordered before the last filter, and the intermediate filter ordered after the first filter and before the last filter with respect to an order in which the filter manager calls the filters with pre-callbacks.

4. The system of claim 1 wherein each filter comprises an instance of a filter driver registered for a particular file system volume, and wherein at least two instances of a filter driver registered for a particular file system volume comprise the same type of filter driver.

5. The system of claim 1 wherein the filter driver calls back at least one filter driver in a post-callback operation.

6. The system of claim 1 wherein the status value comprises at least one member of a set containing: a finished status value, a status value indicating that additional processing is required in response to the post-callback to the first filter driver, a status value that indicates success and a request to not be called back with a post-callback, a status value that indicates success and a request to be called back with a post-callback, a pending status, a synchronize status and a status value that indicates that fast I/O is disallowed.

7. The system of claim 1 wherein the filter manager preserves parameter information for at least one of the filter drivers called with a pre-callback, and retrieves and provides at least part of the preserved parameter information to that filter driver during a post-callback operation.

8. The system of claim 1 wherein the filter manager receives a request for returning a context to a filter driver, and wherein the filter manager returns data corresponding to the context, the data corresponding to at least one item of a set, the set containing: a context structure, a stream handle, a stream, a file, a volume and an instance.

9. The system of claim 1 wherein the filter manager maintains a tree of nodes associated with a stream, each node representing an instance, and wherein the filter driver provides a file object identifier and an instance identifier to the filter manager as a key for locating the context structure based on information in the tree.

10. In a computing environment, a method performed by a filter manager, the method comprising:
    registering a plurality of filter drivers in a callback order, the plurality including an intermediate filter driver that is below a higher filter driver and is above a lower filter driver;
    receiving a file system-directed I/O request initiated at the intermediate filter driver, the I/O request comprising callback data supplied by the intermediate filter driver, the callback data comprising a uniform structure for representing each of IRPs, fast I/O paths, and Fs Filter callbacks;

maintaining information that indicates that the I/O request was initiated by the intermediate filter driver;

sending the I/O request towards the file system including converting the I/O request from callback data to one of an IRP, a fast I/O path, or a Fs Filter callback prior to sending the I/O request to the file system;

receiving status data from the file system corresponding to the I/O request;

returning the status data to the intermediate filter driver that initiated the I/O request; and accessing the information that indicates that the I/O request was initiated by the intermediate filter driver so as to not pass the status data to the higher filter driver.

11. The method of claim 10 further comprising pre-calling the lower filter driver with callback data corresponding to the I/O request.

12. The method of claim 10 further comprising, post-calling the lower filter driver with callback data corresponding to the status data.

13. The method of claim 10 wherein the I/O request comprises a request to create a file, and wherein maintaining the information comprises requesting creation of the file with a hint that identifies the intermediate filter driver as having initiated the request.

14. The method of claim 10 further comprising, receiving a write request initiated at the intermediate filter driver corresponding to the created file, sending the write request towards the file system, receiving another set of status data from the file system corresponding to the write request, returning the other set of status data to the intermediate filter driver, and accessing the information to determine that the other set of status data corresponds to the file created with the hint so as to not pass the other status data to the higher filter driver.

15. The method of claim 10 further comprising, receiving a read request initiated at the intermediate filter driver corresponding to the created file, sending the read request towards the file system, receiving another set of status data from the file system corresponding to the read request, returning the other set of status data to the intermediate filter driver, and accessing the information to determine that the other set of status data corresponds to the file created with the hint so as to not pass the other status data to the higher filter driver.

* * * * *

UNITED STATES PATENT AND TRADEMARK OFFICE
CERTIFICATE OF CORRECTION

| | | |
|---|---|---|
| PATENT NO. | : 7,779,425 B2 | Page 1 of 1 |
| APPLICATION NO. | : 11/344258 | |
| DATED | : August 17, 2010 | |
| INVENTOR(S) | : Ravisankar Pudipeddi et al. | |

It is certified that error appears in the above-identified patent and that said Letters Patent is hereby corrected as shown below:

In column 21, line 2, in Claim 10, after "structure" delete "for".

Signed and Sealed this
First Day of February, 2011

David J. Kappos
*Director of the United States Patent and Trademark Office*